US007706336B2

(12) United States Patent
Sheynman et al.

(10) Patent No.: US 7,706,336 B2
(45) Date of Patent: Apr. 27, 2010

(54) MOBILE STATION ARCHITECTURES FOR CIRCUIT AND PACKET MODES AND METHODS THEREFOR

(75) Inventors: Arnold Sheynman, Glenview, IL (US); Jatin J. Patel, Downers Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/795,704

(22) Filed: Feb. 28, 2001

(65) Prior Publication Data
US 2002/0118662 A1 Aug. 29, 2002

(51) Int. Cl.
H04W 4/00 (2009.01)
H04B 7/216 (2006.01)
H04B 1/04 (2006.01)

(52) U.S. Cl. .................. 370/338; 370/335; 370/342; 455/127.4

(58) Field of Classification Search ............. 370/328, 370/338, 352, 354, 349, 401, 402, 409, 465; 455/422
See application file for complete search history.

(56) References Cited

U.S. PATENT DOCUMENTS

| | | | | |
|---|---|---|---|---|
| 5,533,019 A | * | 7/1996 | Jayapalan | 370/352 |
| 5,574,773 A | * | 11/1996 | Grob et al. | 455/466 |
| 5,590,133 A | | 12/1996 | Billström et al. | |
| H1641 H | * | 4/1997 | Sharman | 370/338 |
| 5,729,534 A | | 3/1998 | Jokinen et al. | |
| 5,734,980 A | * | 3/1998 | Hooper et al. | 455/434 |
| 5,946,634 A | * | 8/1999 | Korpela | 455/552.1 |
| 6,035,212 A | * | 3/2000 | Rostoker et al. | 455/552.1 |
| 6,075,783 A | * | 6/2000 | Voit | 370/352 |
| 6,104,711 A | * | 8/2000 | Voit | 370/352 |
| 6,108,562 A | * | 8/2000 | Rydbeck et al. | 455/552.1 |
| 6,119,003 A | * | 9/2000 | Kukkohovi | 455/435 |
| 6,192,239 B1 | * | 2/2001 | Lee et al. | 455/425 |
| 6,320,873 B1 | * | 11/2001 | Nevo et al. | 370/466 |

(Continued)

FOREIGN PATENT DOCUMENTS

EP 1006746 A2 * 6/2000

(Continued)

OTHER PUBLICATIONS

TR45 SP-4027-370 TDMA Third-Generation Wireless Enhanced General Packet-Data Service (EGPRS-136) Overview, Telecommunications Industry Associates, Arlington, Va, United States.

(Continued)

Primary Examiner—Steven H Nguyen
(74) Attorney, Agent, or Firm—Roland K. Bowler, II

(57) ABSTRACT

Mobile station communication architectures for supporting circuit and packet modes of operation and methods therefor, for example time division multiple access (TDMA) and general packet radio services (GPRS) in a cellular telephone handset. In one exemplary embodiment, the architecture includes a router and operating mode switch (108) coupled to an RF transceiver (112), a packet stack (102) coupled to the RF transceiver, a circuit stack (104) coupled to the router and operating mode switch and to the packet stack, the RF transceiver, and to the circuit stack coupled to the packet stack, and an interoperability entity (106) coupled to the router and operating mode switch and to the packet and circuit stacks.

26 Claims, 5 Drawing Sheets

U.S. PATENT DOCUMENTS

| | | | | |
|---|---|---|---|---|
| 6,389,008 B1 | * | 5/2002 | Lupien et al. | 370/352 |
| 6,400,712 B1 | * | 6/2002 | Phillips | 370/355 |
| 6,400,946 B1 | * | 6/2002 | Vazvan et al. | 455/432 |
| 6,438,115 B1 | * | 8/2002 | Mazur et al. | 370/330 |
| 6,438,117 B1 | * | 8/2002 | Grilli et al. | 370/331 |
| 6,452,940 B1 | * | 9/2002 | Yared et al. | 370/465 |
| 6,453,171 B1 | * | 9/2002 | Auvray | 455/552 |
| 6,463,298 B1 | * | 10/2002 | Sorenson et al. | 455/552 |
| 6,466,548 B1 | * | 10/2002 | Fitzgerald | 370/249 |
| 6,526,034 B1 | * | 2/2003 | Gorsuch | 370/338 |
| 6,535,979 B1 | * | 3/2003 | Vialen et al. | 713/163 |
| 6,542,516 B1 | * | 4/2003 | Vialen et al. | 370/465 |
| 6,625,420 B1 | * | 9/2003 | Naqvi et al. | 455/8 |
| 6,650,909 B1 | * | 11/2003 | Naqvi et al. | 455/560 |
| 6,707,808 B1 | * | 3/2004 | Vedrine | 370/337 |
| 6,721,581 B1 | * | 4/2004 | Subramanian | 455/575.1 |
| 6,801,516 B1 | * | 10/2004 | Lomp et al. | 370/342 |
| 6,804,532 B1 | * | 10/2004 | Moon et al. | 370/328 |
| 6,813,256 B1 | * | 11/2004 | Nevo et al. | 370/335 |
| 6,853,851 B1 | * | 2/2005 | Rautiola et al. | 455/553.1 |
| 6,934,319 B2 | * | 8/2005 | Subramanian | 375/142 |
| 6,961,573 B1 | * | 11/2005 | Moon et al. | 455/445 |
| 6,967,999 B2 | * | 11/2005 | Subramanian et al. | 375/224 |
| 7,068,624 B1 | * | 6/2006 | Dantu et al. | 370/331 |
| 2002/0193139 A1 | * | 12/2002 | Mildh et al. | 455/552 |

FOREIGN PATENT DOCUMENTS

| | | |
|---|---|---|
| EP | 1022868 A1 * | 7/2000 |
| WO | WO 0131963 A1 * | 5/2001 |

OTHER PUBLICATIONS

3$^{rd}$ Generation Partnership Project; Technical Specification Group Services and System Aspects; General Packet Radio Services (GPRS); Service description; Stage 2 (Release 1999), 3Grs 23.060 V3.3.1 (May 2000), 3GPP support office, Valbonne—France.

TR45 SP-4027-123-C TDMA Third Generation Wireless Digital Control Channel Layer 3.

TR45 SP-4027-376 TDMA Third-Generation—Enhanced General Packet-Data Service (EGPRS-136) mobility Management (MM), Telecommunications Industry Associates, Arlington, Va, United States.

* cited by examiner

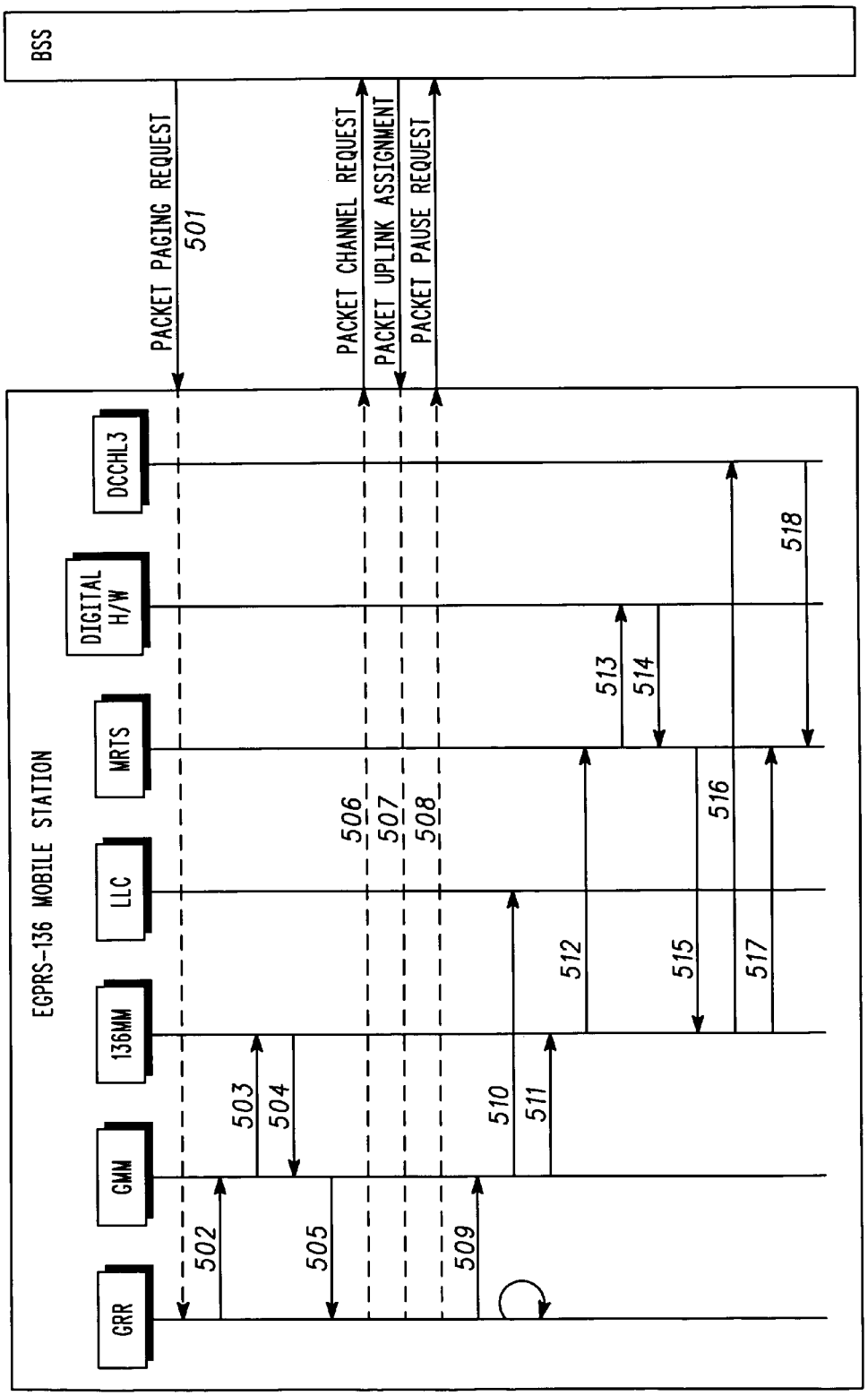

MOBILE STATION ARCHITECTURES FOR CIRCUIT AND PACKET MODES AND METHODS THEREFOR

FIELD OF THE DISCLOSURE

The present disclosure relates generally to mobile station communications and, more particularly, to mobile station communication architectures supporting circuit and packet modes of operation, for example, time division multiple access (TDMA) and general packet radio services (GPRS) in a cellular telephone handset.

BACKGROUND

The deployment of some digital communication system architectures requires mobile stations that support both packet data and circuit service.

The EGPRS-136 Class B multi-mode communication system architecture, for example, integrates the TIA/EIA-136 standard air interface, also known as Time Division Multiple Access (TDMA), with the General Packet Radio Service (GPRS) standard specified by the European Telecommunications Standards Institute (ETSI) and the Third Generation Partnership Project (3GPP).

The EGPRS-136 Class B architecture supports circuit service (30 KHz TDMA), packet data services on a 200 KHz air interface, teleservices defined in the Global System for Mobile communication (GSM) standards, TIA/EIA-136 teleservices, Intelligent Roaming functions and TIA/EIA-41 short messaging services.

The EGPRS-136 Class B mobile station architecture provides for sequential, but not simultaneous, packet data and circuit mode services. Thus when a circuit call is initiated, either by the network or the mobile station, during a packet data transaction, packet data service is interrupted for execution of the circuit call. Thereafter, packet data service resumes upon termination of the circuit call.

Integration of packet and circuit architectures, including the EGPRS-136 Class B architecture, in multi-mode mobile stations requires packet and circuit switched mode interoperability.

The various aspects, features and advantages of the present invention will become more fully apparent to those having ordinary skill in the art upon careful consideration of the following Detailed Description of the invention with the accompanying drawings described below.

BRIEF DESCRIPTION OF THE DRAWINGS

FIG. 5 is a packet/circuit mode switching scenario diagram.

DETAILED DESCRIPTION

Figure 1:
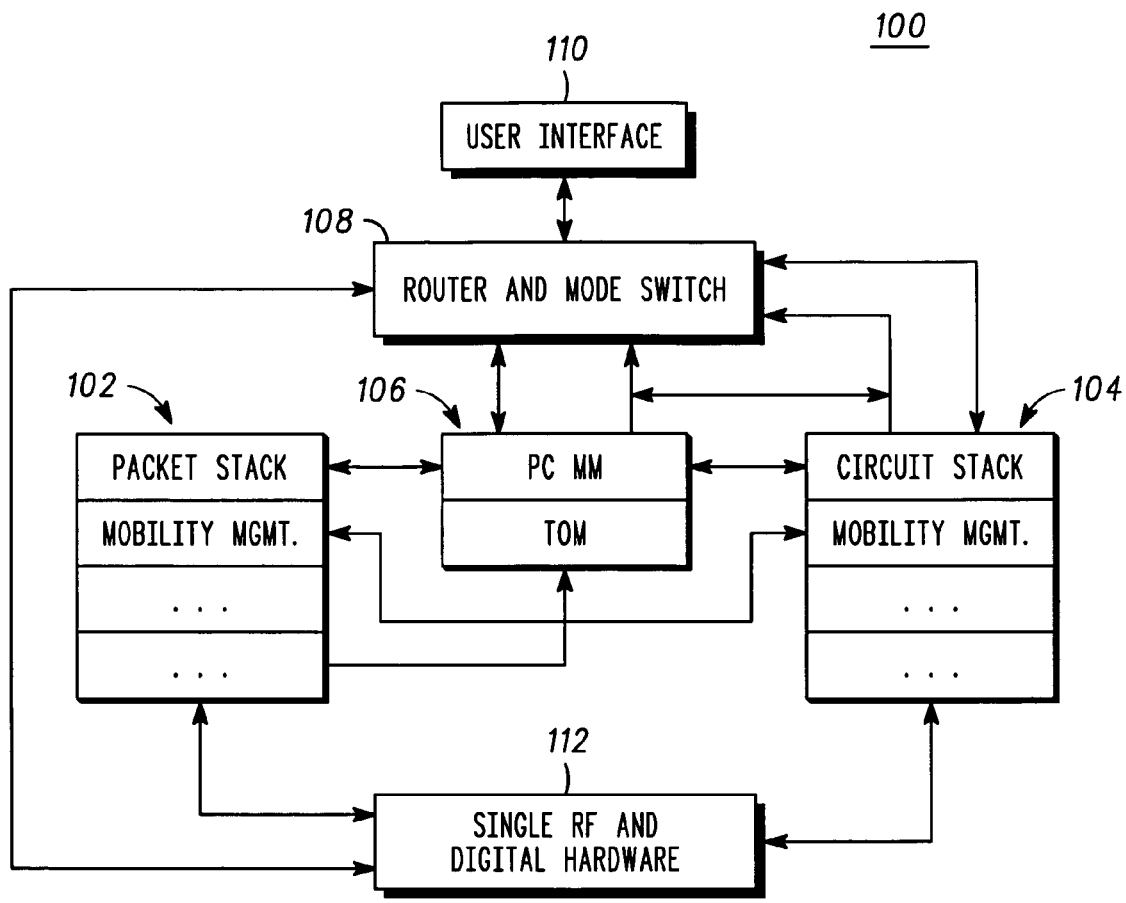
FIG. 1 is schematic block diagram of an exemplary mobile station supporting packet and circuit modes of operation.
Figure 2:
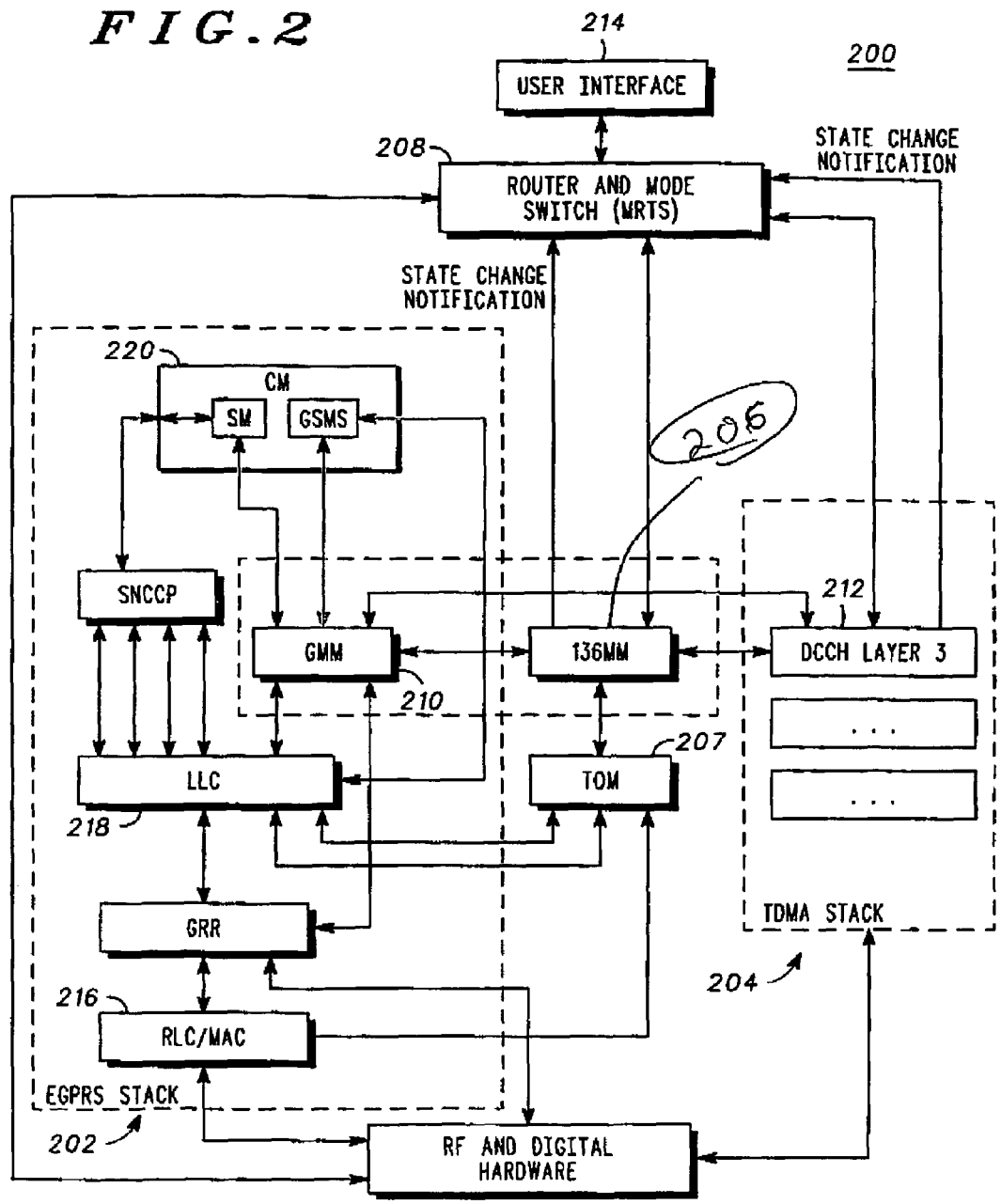
FIG. 2 is a schematic block diagram of an EGPRS-136 mobile station architecture according to an exemplary embodiment of the invention.

FIG. 1 illustrates a mobile station 100 supporting packet and circuit modes of operation. FIG. 2 illustrates an exemplary EGPRS-136 multi-mode, mobile station architecture 200 integrating the TIA/EIA-136 standard air interface with the General Packet Radio Service (GPRS) standard specified by the European Telecommunications Standards Institute and the Third Generation Partnership Project.

In FIG. 1, the mobile station comprises generally a packet stack 102 for supporting packet mode operation, for example EGPRS or other packet data services, and a circuit stack 104 for supporting circuit mode, for example TDMA, or CDMA, or W-CDMA or some other circuit service. In the exemplary EGPRS-136 multi-mode architecture of FIG. 2, the packet stack is an EGPRS stack 202, and the circuit stack is a TDMA stack 204.

In FIG. 1, the packet and circuit stacks are coupled to each other for communications therebetween, for example, for communicating among other information a list of packet channels derived from control channel broadcast information with a system identifier. In the exemplary architecture of FIG. 2, a list of packet channels derived from Digital Control Channel (DCCH) broadcast information with a system identifier is communicated between the TDMA and EGPRS stacks.

In FIG. 1, the mobile station 100 comprises an interoperability entity 106 coupled to the packet and circuit stacks for communications therebetween, for example, for communicating mode or state changes, among other information. The interoperability entity 106 and the circuit stack 104 are coupled to a router and operating mode switch 108 for communications therebetween, for example to communicate mode or state changes, among other information.

Generally, the interoperability entity comprises a tunneling of messages (TOM) entity and a packet mode circuit mobility management entity. In one embodiment, the TOM entity is coupled to the packet stack for communications therebetween, for example to acknowledge whether circuit control information is transmitted over a packet channel air interface, although this information may be communicated by some other technology.

In FIG. 2, the interoperability entity comprises a 136 Mobility Management (136MM) entity 206 coupled to a tunneling of messages (TOM) entity 207. The 136MM entity 206 is also coupled to a router and operating mode switch (MRTS) 208. The TOM entity 207 is coupled to the EGPRS stack 202. Particularly, the EGPRS stack comprises an RLC entity 216 coupled to the TOM entity 207, and a Logical Link Control (LLC) entity 218 coupled to both the TOM entity 207 and to the GMM entity 210. The EGPRS stack 202 also comprises a connection management entity 220 coupled to the LLC entity 218 and to the GMM entity 210.

Generally, the packet stack comprises a packet mode mobility management entity, and the circuit stack comprises a circuit mode mobility management entity. In the exemplary architecture of FIG. 2, for example, the EGPRS stack comprises a GPRS Mobility Management (GMM) entity 210 coupled to the 136MM entity 206. The TDMA stack 204 comprises a Digital Control Channel Layer 3 Mobility Management (DCCH Layer 3) entity 212 coupled to the GMM entity 210 and to the 136MM entity 206. The DCCH Layer 3 entity 212 and the 136 MM entity are both coupled to the router and operating mode switch 208. Packet stack mobility management is provided by the 136MM entity of the interoperability entity. Circuit stack mobility management is provided by the DCCH Layer 3 entity 212.

In FIG. 1, the router and operating mode switch 108 is coupled to a user interface 110 comprising inputs and outputs, for example input keys and devices, visual displays, accessory adapters, etc. Generally, the router and mode switch communicates display information from the packet and circuit stacks to the user interface.

In FIG. 1, display and other information is communicated from the packet and data stacks through the corresponding mobility management entities, to the user interface 110 via the router and mode switch 108. In the exemplary architecture of FIG. 2, for example, display information from the EGPRS and TDMA stacks is communicated via the 136MM and DCCH Layer 3 entities 206 and 212 and the MRTS 208 to the user interface 214.

The mobility management entities also communicate mode and state change information to the router and mode switch 108. In FIG. 2, this information is communicated from the 136MM entity 206 and the DCCH Layer 3 entity 212 to the MRTS 208.

Generally, mode and state change information is communicated between the mobility management entities. In the exemplary architecture of FIG. 2, this information is communicated between the 136MM entity 206 and the DCCH Layer 3 entity 212. The 136 MM entity for example notifies the DCCH Layer 3 entity of changes to TDMA service, circuit page receipts, and call originations. Some of this information is generally sent along with pointers to one or more TDMA control channels derived from information broadcasts on the packet channel. The DCCH Layer 3 entity, for example, notifies the 136MM entity that packet service has been acquired, and that power down has been requested.

Packet channel selection information, e.g., success or failure, is communicated between the EGPRS stack and the TDMA stack, and particularly to the DCCH Layer 3 entity 212. The DCCH Layer 3 entity, for example, sends a list of packet channels derived from broadcast information along with system identifier information to the EGPRS stack.

The router and operating mode switch 108 is also coupled to an RF transmitter/receiver (transceiver) 112. In one embodiment, a single RF transceiver is tunable by a programmable digital signal processor in response to communications from the router and mode switch for operation at different frequencies for packet or circuit mode, depending on whether the mobile station is in packet or circuit mode. In an alternative embodiment, the RF transceiver is controlled by dedicated signal processors, one for circuit mode operation and the other for packet mode operation.

In one embodiment, only one circuit mobility management entity is active at any given time, for example, the 136MM entity or the DCCH Layer 3 entity in the exemplary EGPRS-136 Class B mobile station architecture. The active mobility management entity is communicated to the router and mode switch, which accordingly invokes proper tuning of the RF transceiver for the active mode. In the exemplary architecture of FIG. 2, for example, the router and operating mode switch 208 configures the RF transceiver and digital hardware for packet or circuit mode and notifies at least one of the 136MM entity and the DCCH Layer 3 entity of the RF transceiver configuration.

In the exemplary architecture of FIG. 2, the EGPRS stack comprises an RLC entity coupled to the TOM entity for acknowledging whether circuit control information is transmitted over the packet channel air interface. The EGPRS stack comprises a Logical Link Control (LLC) 218 entity coupled to both the TOM entity 207 and to the GMM entity 210. The EGPRS stack also comprises a connection management entity 220 coupled to the GMM entity 210.

Figure 3:
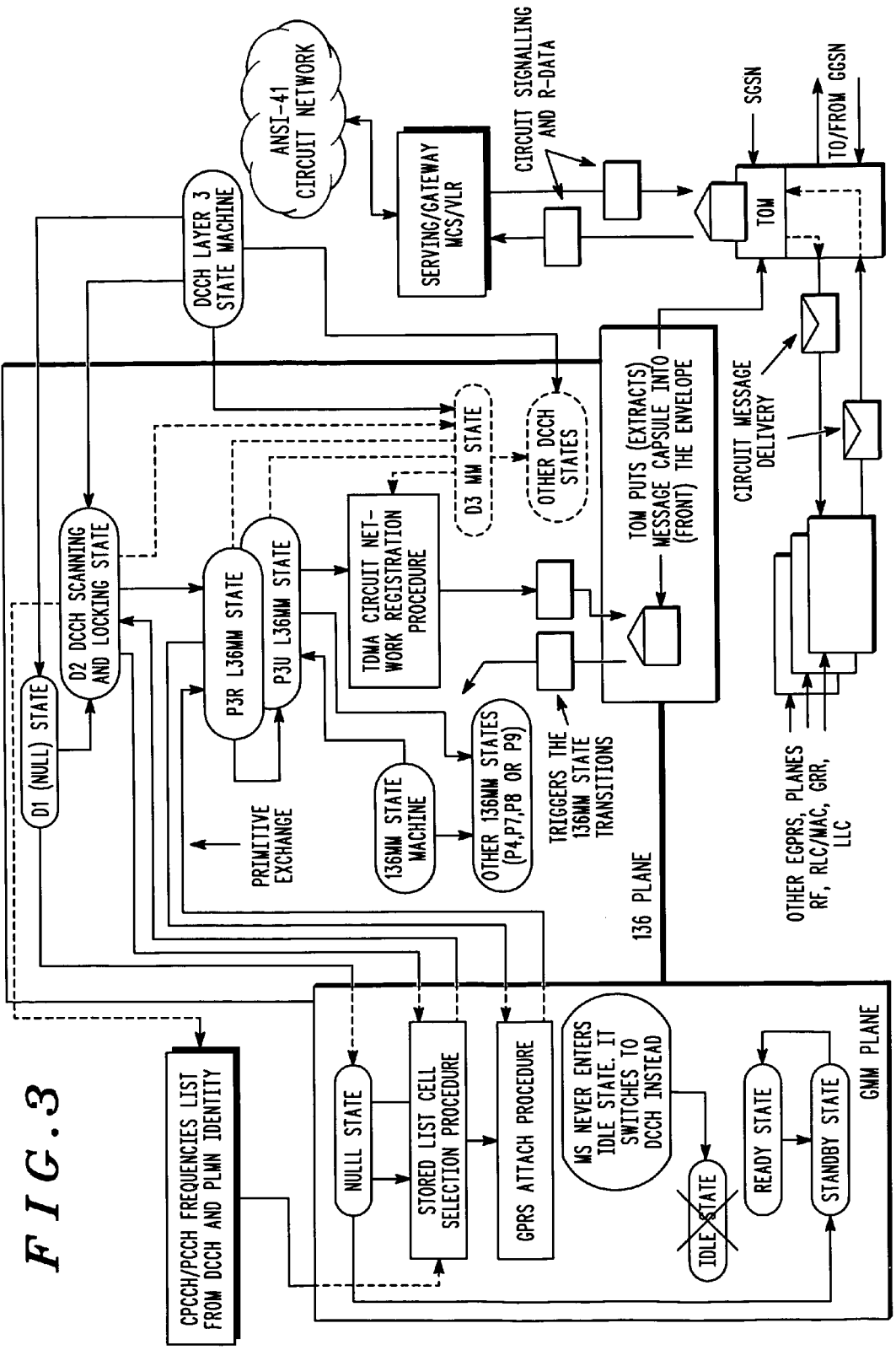
FIG. 3 is a state diagram illustrating interoperability during a power-up scenario.

FIG. 3 illustrates interoperability in a mobile station (MS) power-up scenario for the exemplary EGPRS-136 architecture. In this architecture, the MS enters the packet mode through the TIA/EIA-136 Digital Control Channel (DCCH).

During power-up, the MS enters the D1 (Null) State and then the D2 DCCH Scanning and Locking State of the TDMA DCCH Layer 3 State Machine in the 136 Plane. At the same time, the MS enters the Null State of the GMM State Machine in the GMM Plane. The MS reads and decodes one or more frequency pointers to packet channels broadcast on the DCCH using TDMA technology, i.e., 30 KHz. Thereafter, the MS executes a packet GPRS cell selection procedure using a list of EGPRS-136 channel pointers along with system identity information, e.g. a PLMN identity. The GMM entity notifies the DCCH State Machine about the packet channel search results.

If a packet channel has been found successfully, the MS enters the P3R state of the 136 Mobility Management (P3R 136MM) State Machine that supports the mobility management of the TIA/EIA-41 circuit switched network when the packet channel is present (instead of entering the D3 MM State of the DCCH Layer 3 State Machine illustrated in phantom lines). At the same time, the MS enters a neutral state in the DCCH Layer 3 State Machine, because the circuit switched mobility management has been transferred to the P3R state of the 136MM state machine. If the GPRS cell selection procedure fails to find a packet channel, the MS transfers to the DCCH Layer 3 State Machine where it operates as a voice only TDMA device.

From the P3R 136MM state, the MS activates a GPRS packet service attachment procedure. Upon successful attachment to the packet service, the MS changes state to the P3U 136MM State. Because the MS is physically tuned to the packet control channel (200 kHz PCCH, GMSK/8PSK modulation), the tunneling of messages (TOM) mechanism is used to deliver the circuit switched signaling and teleservices from/to the MS.

From the P3U 136MM State, the MS registers within the TDMA circuit switched network using the TOM mechanism. After registration with the circuit network, the MS co-exists in the 136MM plane and the GMM Plane. The 136 Plane supports signaling and teleservices for the circuit switched activity, and the GMM Plane controls the management for the packet network. In the EGPRS-136 architecture, the MS camps on the packet channel until an interoperability scenario occurs.

Figure 4:
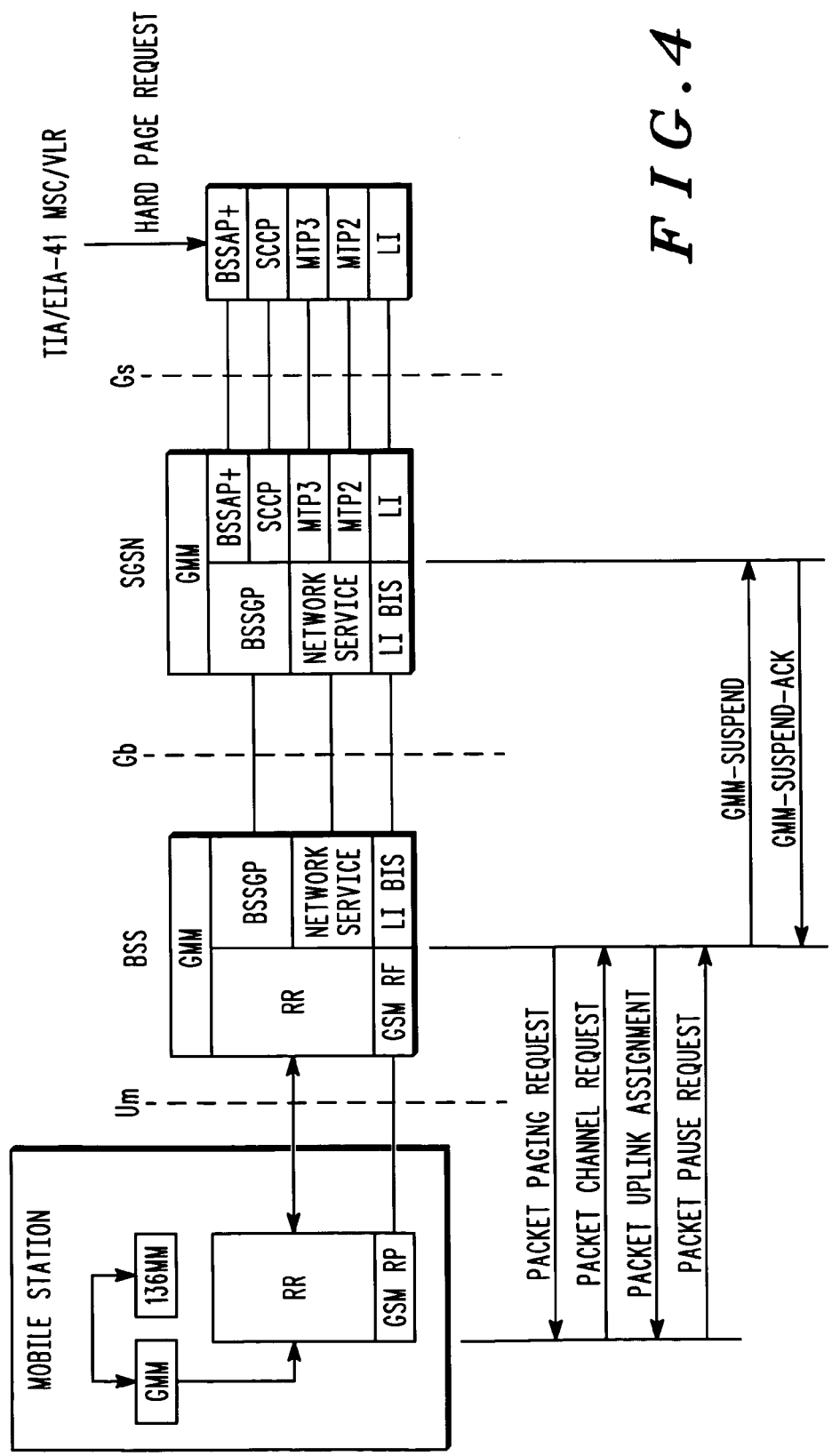
FIG. 4 is an exemplary packet pause interoperability scenario diagram.

FIG. 4 illustrates a packet pause interoperability scenario for the EGPRS-136 architecture. In one embodiment, when the MS, which is physically tuned to the 200 KHz packet channel, receives a page for establishment of a TIA/EIA-136 circuit switched connection, packet activity is interrupted, or paused.

In FIG. 4, the MS is paged with a PACKET PAGING REQUEST message. Upon receipt of the REQUEST message, the MS sends a PACKET CHANNEL REQUEST message indicating "Single block without TBF establishment" to the Base Station System (BSS).

In FIG. 4, a radio resource assignment is assigned by the BSS to the MS in the PACKET UPLINK ASSIGNMENT message. The PACKET UPLINK ASSIGNMENT message from the BSS is sent on any Packet Access Grant Channel (PAGCH) on the same packet common control channel (PCCCH) on which the network has received the PACKET CHANNEL REQUEST message from the MS.

In one embodiment, upon sending the PACKET CHANNEL REQUEST message, the MS starts a timer, for example a 1 second timer. If the timer expires before a PACKET UPLINK ASSIGNMENT message from the BSS is received, the packet access procedure is aborted, and the MS tunes to the DCCH for circuit switched operations.

In FIG. 4, when receiving a PACKET UPLINK ASSIGNMENT message, the MS sends an RLC/MAC PACKET PAUSE message in the allocated radio block on the assigned Packet Data Channel (PDCH). No Temporary Block Flow (TBF) is established and the network does not acknowledge reception of the PACKET PAUSE message. The Base Station System (BSS) sends a GMM suspend message to the Serving GPRS Support Node (SGSN) using the Base Station GPRS Protocol (BSSGP). The SGSN acknowledges the GMM SUSPEND request by sending the BSS a GMM SUSPEND-ACK message. After sending the PACKET PAUSE REQUEST message, the MS tunes to the 30 kHz TDMA DCCH and establishes a circuit switched connection, whereupon MS DCCH Layer 3 mobility management is active.

FIG. 5 illustrates a mode-switching scenario in response to an incoming circuit page in the exemplary EGPRS-136 mobile station architecture. When the MS is paged, the page is sent to the GRR entity or layer at 501. At 502, the GPRS Radio Resource (GRR) entity decodes the page and delivers it to the GMM entity, which in turn notifies the 136MM entity of receipt of the circuit page at 503. The 136MM entity sends a pause request to the GMM entity requesting suspension of packet data operations at 504. The GMM entity notifies the GRR entity and the packet pause procedure is invoked at 505. In response to the message from the GMM entity, the GRR entity constructs a resource request, which is sent to the BSS at 506. At 507, the network replies with a resource assignment to the GRR. Upon receiving the resource assignment, the GRR triggers a packet pause request, which is sent to the BSS at 508. The GRR entity also notifies the GMM entity that the packet pause request has been sent at 509. At 510, the GMM entity issues a primitive that suspends the Logical Link Control (LLC). At 511, the GMM entity notifies the 136MM entity that the packet pause request has issued, and the 136MM entity sends the mode change request to the router and mode switch (MRTS) at 512. The MRTS communicates with the digital hardware, which triggers re-programming of the hardware and the RF transceiver at 513. At 514, the MRTS receives confirmation that the digital hardware has been re-programmed, and at 515 the MRTS notifies the 136MM entity of the change. At 516, the 136MM entity notifies the DCCH Layer 3 entity that the MS has been paged by the network and sends a list of the possible DCCH channel numbers along with other information for finding circuit service. At 517, the 136MM entity notifies the MRTS of state changes, and at 518 the DCCH Layer 3 entity notifies the MRTS of state changes.

While the present disclosure and what is considered presently to be the best modes thereof have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A mobile station supporting packet and circuit modes of operation, comprising:
   an RF transceiver;
   a router and operating mode switch coupled to the RF transceiver;
   a packet stack coupled to the RF transceiver, the packet stack comprises a packet mode mobility management entity;
   a circuit stack coupled to the router and operating mode switch, the circuit stack coupled to the RF transceiver, the circuit stack coupled to the packet stack, the circuit stack comprises a circuit mode mobility management entity;
   an interoperability entity coupled to the router and operating mode switch, the interoperability entity coupled with the packet stack and with the circuit stack.

2. The mobile station of claim 1, the interoperability entity comprises a tunneling of messages (TOM) entity and a packet mode circuit mobility management entity.

3. The mobile station of claim 1, a user interface coupled to the router and operating mode switch.

4. The mobile station of claim 1, a digital signal processor coupled to the router and operating mode switch, the RF transceiver is a tunable RF receiver coupled to the digital signal processor.

5. The mobile station of claim 4, the digital signal processor for programming the tunable RF transceiver in response to the router and operating mode switch.

6. The mobile station of claim 1, means for communicating between the interoperability entity and the router and operating mode switch, means for communicating between the circuit stack and the router and operating mode switch.

7. The mobile station of claim 1, means for communicating operating mode changes between the interoperability entity and the circuit stack.

8. The mobile station of claim 1, means for communicating a list of packet channels derived from control channel broadcast information with a system identifier between the packet stack and the circuit stack.

9. A method in a multi-mode mobile station, the method comprising:
   supporting circuit mode operation of the multi-mode mobile station with circuit technology;
   supporting packet mode operation of the multi-mode mobile station with packet technology,
   the circuit technology and the packet technology are discrete technologies;
   routing messages between a user interface and the circuit technology and the packet technology via a router and mode switch and an interoperability entity;
   communicating information between the circuit technology and the packet technology via the interoperability entity.

10. The method of claim 9, notifying the router and mode switch of a state change by communicating the state change from the circuit technology and the packet technology.

11. The method of claim 10, configuring an RF transceiver for packet or circuit mode operation under control of the router and mode switch.

12. The method of claim 11, notifying at least one of the circuit technology and the packet technology of the configuration of the RF transceiver.

13. A multi-mode wireless communications mobile station architecture, comprising:
   a router and mode switch and an interoperability entity in the multi-mode wireless communications mobile station architecture;
   code division multiple access (CDMA) radio technology in the multi-mode wireless communications mobile station architecture;
   packet data radio technology in the multi-mode wireless communications mobile station architecture,
   the CDMA radio technology and the packet data radio technology coupled to the router and mode switch and to the interoperability entity,
   the CDMA radio technology and the packet data radio technology are discrete technologies, a mobility management entity coupled to the CDMA radio technology and to the packet data radio technology.

14. The multi-mode wireless communications mobile station of claim 13, the router and mode switch and the interoperability entity for routing information to an active one of the CDMA radio technology and packet data radio technology.

15. The multi-mode wireless communications mobile station of claim 14, the interoperability entity interconnecting the CDMA radio technology and the packet data radio technology, the interoperability entity including mobility management for at least one of the radio technologies.

16. The multi-mode wireless communications mobile station of claim 13, the CDMA radio technology includes a circuit stack, the packet data radio technology includes a packet data stack.

17. A mobile station supporting packet and circuit modes of operation, comprising:
 an RF transceiver;
 a router and operating mode switch coupled to the RF transceiver;
 a packet stack coupled to the RF transceiver;
 a circuit stack coupled to the router and operating mode switch, the circuit stack coupled to the RF transceiver, the circuit stack coupled to the packet stack;
 an interoperability entity coupled to the router and operating mode switch, the interoperability entity coupled with the packet stack and with the circuit stack;
 means for communicating operating mode changes between the interoperability entity and the circuit stack.

18. An EGPRS-136 multi-mode, mobile station architecture, comprising:
 a RF transceiver;
 a router and operating mode switch coupled to the RF transceiver;
 an EGPRS stack coupled to the RF transceiver;
 a TDMA stack coupled to the RF transceiver and to the router and operating mode switch;
 an interoperability entity coupled to the TDMA stack and to the EGPRS stack;
 the EGPRS stack having a radio link control entity coupled to the interoperability entity for acknowledging whether circuit control information is transmitted over a packet channel air interface.

19. The mobile station architecture of claim 18, the EGPRS stack having a GPRS Mobility Management (GMM) entity, the TDMA stack having a Digital Control Channel Layer 3 Mobility Management (DCCH Layer 3) entity coupled to the GMM entity, the interoperability entity coupled to the GMM entity and to the DCCH Layer 3 entity.

20. The mobile station architecture of claim 19, the interoperability entity comprising a 136 Mobility Management (136MM) entity coupled to a tunneling of messages (TOM) entity, the 136MM entity coupled to the router and operating mode switch and to the GMM entity, the TOM entity coupled to the EGPRS stack.

21. The mobile station architecture of claim 20, the router and operating mode switch for configuring the RF transceiver for packet or circuit mode and for notifying the 136MM entity and the DCCH Layer 3 entity of the configuration of the RF transceiver.

22. The mobile station architecture of claim 20, the EGPRS stack having a radio link control coupled to the TOM entity.

23. The mobile station architecture of claim 20,
 the EGPRS stack having a Logical Link Control (LLC) entity coupled to the TOM entity and to the GMM entity;
 the EGPRS stack having a connection management entity coupled to the LLC entity and to the GMM entity.

24. The mobile station architecture of claim 20, means for communicating information between the 136MM entity and the DCCH Layer 3 entity.

25. The mobile station architecture of claim 18, a user interface, the router and operating mode switch coupled to the user interface.

26. The mobile station architecture of claim 18, means for communicating a list of packet channels derived from Digital Control Channel (DCCH) broadcast information with a system identifier between the TDMA stack and EGPRS stack.

* * * * *